(12) United States Patent
Balan et al.

(10) Patent No.: US 10,146,335 B2
(45) Date of Patent: *Dec. 4, 2018

(54) MODULAR EXTENSION OF INERTIAL CONTROLLER FOR SIX DOF MIXED REALITY INPUT

(71) Applicant: MICROSOFT TECHNOLOGY LICENSING, LLC, Redmond, WA (US)

(72) Inventors: Alexandru Octavian Balan, Sammamish, WA (US); Constantin Dulu, Bothell, WA (US); Christopher Douglas Edmonds, Carnation, WA (US); Mark James Finocchio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/274,387

(22) Filed: Sep. 23, 2016

(65) Prior Publication Data

US 2017/0357334 A1    Dec. 14, 2017

Related U.S. Application Data

(60) Provisional application No. 62/347,866, filed on Jun. 9, 2016.

(51) Int. Cl.
G06F 3/033 (2013.01)
G06F 3/0346 (2013.01)
(Continued)

(52) U.S. Cl.
CPC ....... *G06F 3/0346* (2013.01); *G02B 27/0172* (2013.01); *G06F 3/011* (2013.01);
(Continued)

(58) Field of Classification Search
CPC ... G06F 3/00; G06F 3/01; G06F 3/011; G06F 3/017; G06F 3/0346; G06F 3/038;
(Continued)

(56) References Cited

U.S. PATENT DOCUMENTS

| | | |
|---|---|---|
| 6,987,504 B2 | 1/2006 | Rosenberg et al. |
| 7,206,626 B2 | 4/2007 | Quaid, III |

(Continued)

FOREIGN PATENT DOCUMENTS

WO    2012142202 A1    10/2012

OTHER PUBLICATIONS

"International Search Report and the Written Opinion" issued in PCT Application No. PCT/US2017/035569 dated Sep. 21, 2017.
(Continued)

*Primary Examiner* — Joe H Cheng
(74) *Attorney, Agent, or Firm* — Workman Nydegger

(57) ABSTRACT

A modular holding fixture for selectively coupling to a wireless hand-held inertial controller to provide passive optical and inertial tracking in a slim form-factor for use with a head mounted display that operates with six degrees of freedom by fusing (i) data related to the position of the controller derived from a forward-facing depth camera located in the head mounted display with (ii) data relating to the orientation of the controller derived from an inertial measurement unit located in the controller.

20 Claims, 10 Drawing Sheets

(51) Int. Cl.

| | |
|---|---|
| *H04N 13/204* | (2018.01) |
| *H04N 13/257* | (2018.01) |
| *H04N 13/344* | (2018.01) |
| *H04N 13/366* | (2018.01) |
| *H04N 13/398* | (2018.01) |
| *G02B 27/01* | (2006.01) |
| *G06F 3/01* | (2006.01) |
| *G06F 3/038* | (2013.01) |
| *G06T 19/00* | (2011.01) |
| *G06F 3/03* | (2006.01) |

(52) U.S. Cl.
CPC ............ *G06F 3/017* (2013.01); *G06F 3/0304* (2013.01); *G06F 3/0308* (2013.01); *G06F 3/038* (2013.01); *G06T 19/006* (2013.01); *H04N 13/204* (2018.05); *H04N 13/257* (2018.05); *H04N 13/344* (2018.05); *H04N 13/366* (2018.05); *H04N 13/398* (2018.05); *G02B 2027/0134* (2013.01); *G02B 2027/0174* (2013.01); *G02B 2027/0178* (2013.01); *H04N 2213/001* (2013.01)

(58) Field of Classification Search
CPC .. G02B 27/01; G02B 27/0134; G02B 27/017; G02B 27/0174; G02B 2027/0134; G02B 2027/0138; G02B 2027/014; G06T 19/00; G06T 19/006; H04N 13/0011; H04N 13/0203; H04N 13/0468
See application file for complete search history.

(56) References Cited

U.S. PATENT DOCUMENTS

| | | | |
|---|---|---|---|
| 7,467,061 B2 | 12/2008 | Satoh et al. | |
| 7,511,736 B2 | 3/2009 | Benton | |
| 7,927,216 B2 | 4/2011 | Ikeda et al. | |
| 7,961,909 B2* | 6/2011 | Mandella | G01B 21/04 178/18.01 |
| 8,224,024 B2 | 7/2012 | Foxlin et al. | |
| 8,555,205 B2* | 10/2013 | Ye | G06F 3/016 715/848 |
| 8,568,233 B2 | 10/2013 | Block et al. | |
| 8,696,458 B2 | 4/2014 | Foxlin et al. | |
| 9,024,972 B1 | 5/2015 | Bronder et al. | |
| 9,176,598 B2 | 11/2015 | Sweetser et al. | |
| 9,310,887 B2 | 4/2016 | Wieder | |
| 9,737,797 B2 | 8/2017 | Barney et al. | |
| 2002/0024675 A1 | 2/2002 | Foxlin | |
| 2005/0190972 A1 | 9/2005 | Thomas et al. | |
| 2006/0221072 A1 | 10/2006 | Se et al. | |
| 2007/0247422 A1 | 10/2007 | Vertegaal et al. | |
| 2007/0265075 A1 | 11/2007 | Zalewski | |
| 2008/0080789 A1 | 4/2008 | Marks et al. | |
| 2009/0164952 A1 | 6/2009 | Wilson | |
| 2009/0183929 A1 | 7/2009 | Zhang et al. | |
| 2009/0209343 A1 | 8/2009 | Foxlin et al. | |
| 2009/0298590 A1 | 12/2009 | Marks et al. | |
| 2011/0018903 A1 | 1/2011 | Lapstun et al. | |
| 2012/0075168 A1* | 3/2012 | Osterhout | G02B 27/017 345/8 |
| 2012/0109150 A1 | 5/2012 | Quaid et al. | |
| 2012/0122576 A1 | 5/2012 | Mao | |
| 2012/0287284 A1* | 11/2012 | Jacobsen | G06F 1/163 348/158 |
| 2013/0064427 A1 | 3/2013 | Picard et al. | |
| 2013/0217488 A1* | 8/2013 | Comsa | G06F 17/00 463/31 |
| 2014/0049558 A1* | 2/2014 | Krauss | G06F 3/011 345/633 |
| 2014/0152531 A1* | 6/2014 | Murray | G06F 1/1632 345/8 |
| 2014/0168261 A1* | 6/2014 | Margolis | G06F 3/011 345/633 |
| 2014/0277744 A1 | 9/2014 | Coenen | |
| 2014/0362110 A1* | 12/2014 | Stafford | G06F 3/013 345/633 |
| 2014/0364209 A1* | 12/2014 | Perry | G06F 3/013 463/31 |
| 2015/0085111 A1 | 3/2015 | Lavery | |
| 2015/0182293 A1 | 7/2015 | Yang et al. | |
| 2015/0286275 A1 | 10/2015 | Huang et al. | |
| 2015/0317834 A1* | 11/2015 | Poulos | G06F 3/012 345/619 |
| 2016/0098095 A1* | 4/2016 | Gonzalez-Banos | G06F 3/017 345/156 |
| 2016/0228771 A1* | 8/2016 | Watson | G06F 3/013 |
| 2016/0262608 A1* | 9/2016 | Krueger | A61B 3/0041 |
| 2017/0047051 A1 | 2/2017 | Deering et al. | |
| 2017/0148214 A1* | 5/2017 | Muniz-Simas | G06T 19/006 |
| 2017/0220119 A1* | 8/2017 | Potts | G06F 3/016 |
| 2017/0307891 A1* | 10/2017 | Bucknor | G01S 1/70 |
| 2017/0357333 A1 | 12/2017 | Balan et al. | |
| 2017/0358139 A1* | 12/2017 | Balan | G02B 27/0172 |

OTHER PUBLICATIONS

"Wii Remote—Wikipedia, The Free Encyclopedia," Published Dec. 22, 2015, Available at <<https://web.archive.org/web/20151222080603/https://en.wikipedia.org/wiki/Wii_Remote>>.

"Wii Motion Plus—Wikipedia, The Free Encyclopedia," Published Oct. 31, 2015, Available at <<http://web.archive.org/web/20151031160525/http://en.wikipedia.org/wiki/Wii_MotionPlus>>.

Hincapié-Ramos, et al., "GyroWand: IMU-based Raycasting for Augmented Reality Head-Mounted Displays", In Proceedings of the 3rd ACM Symposium on Spatial User Interaction, Aug. 8, 2015, pp. 89-98.

"Here Are Instructions and Information about Selfie on a Stick Selfie Sticks and Answers to Frequently Asked Questions", Published on: Sep. 29, 2015 Available at: http://www.selfieonastick.com/helpful-hints/.

Tobergte, et al., "Robust Multi Sensor Pose Estimation for Medical Applications", In Journal of IEEE/RSJ, International Conference on Intelligent Robots and Systems., Oct. 10, 2009, pp. 492-497.

"Non Final Office Action Issued in U.S. Appl. No. 15/274,334", dated Dec. 5, 2017, 12 Pages.

"International Search Report and Written Opinion Issued in PCT Application No. PCT/US2017/035338", dated Sep. 11, 2017, 17 Pages.

Chen, et al., "Structure and Motion by Fusion of Inertial and Vision-Based Tracking", In Proceedings of 28th OAGM/AAPR Conference, vol. 179., May 25, 2016, pp. 1-8.

Gustafsson, "Sensor Fusion for Augmented Reality", In Technical Report LiTH-ISY-R-2875, Jan. 8, 2009, 3 Pages.

He, et al., "An Inertial and Optical Sensor Fusion Approach for Six Degree-of-Freedom Pose Estimation", In Journal of Sensors, vol. 15, Issue 7, Jul. 8, 2015, pp. 16448-16465.

Kumar, et al., "An Improved Tracking Using IMU and Vision Fusion for Mobile Augmented Reality Applications", In International Journal of Multimedia and Its Applications, vol. 6, Issue 5, Oct. 2014, pp. 13-29.

Ligorio, et al., "Extended Kalman Filter-Based Methods for Pose Estimation Using Visual, Inertial and Magnetic Sensors: Comparative Analysis and Performance Evaluation.", In journal of Sensors, vol. 13, Issue 2, Feb. 4, 2013, 23 Pages.

Chai, et al., "3-D Motion and Structure Estimation using Inertial Sensors and Computer Vision for Augmented Reality", In Journal of Presence: Teleoperators and Virtual Environments, vol. 11, Issue 5, Oct. 2002, 40 Pages.

\* cited by examiner

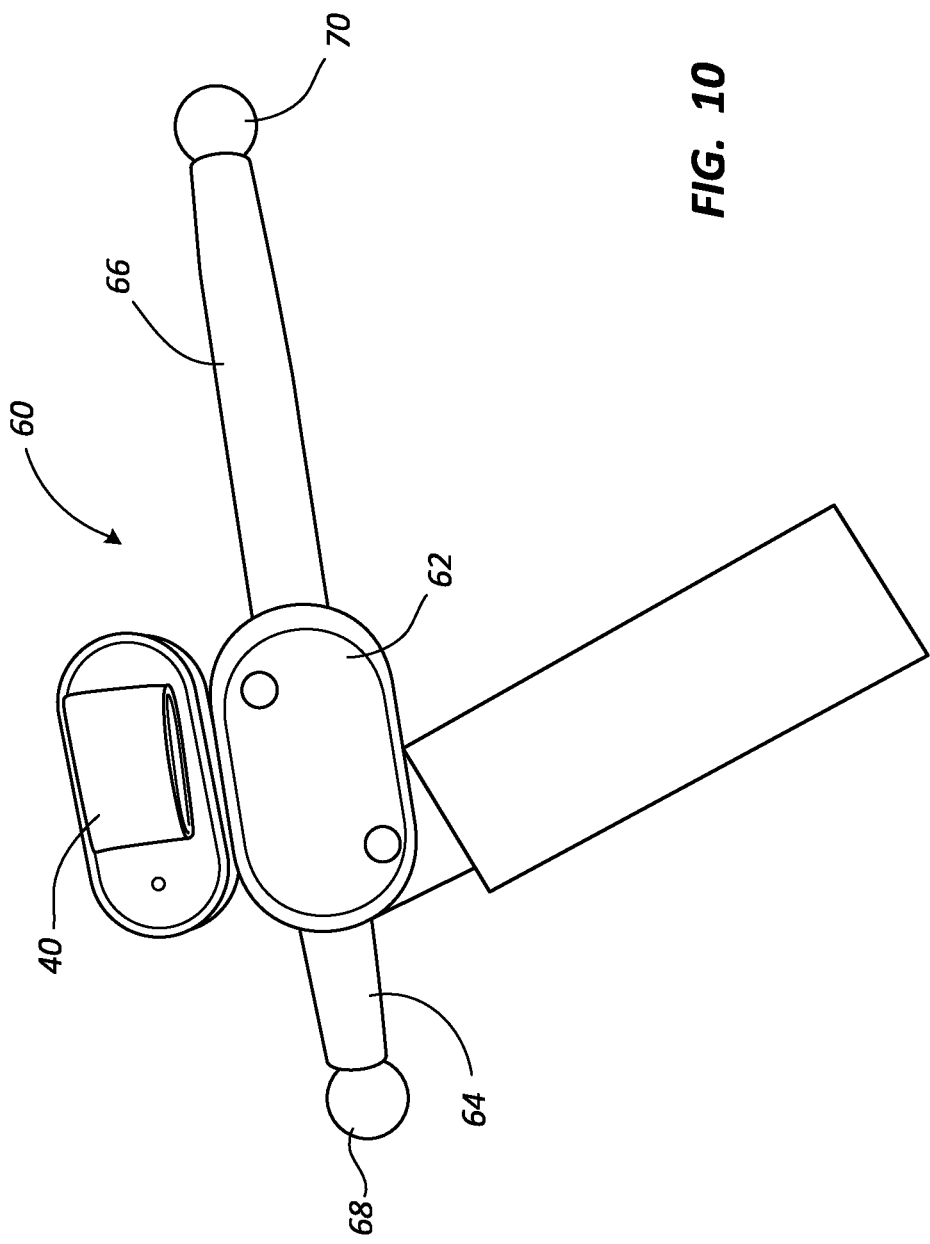

MODULAR EXTENSION OF INERTIAL CONTROLLER FOR SIX DOF MIXED REALITY INPUT

BACKGROUND

Background and Relevant Art

Mixed reality is a technology that allows virtual imagery to be mixed with a real world physical environment in a display. Systems for mixed reality may include, for example, see through head mounted display (HMD) devices or smart phones with built in cameras. Such systems typically include processing units which provide the imagery under the control of one or more applications. Full virtual reality environments in which no real world objects are viewable can also be supported using HMD and other devices.

Such systems may also include one or more wireless hand-held inertial controllers that the user of the system can manipulate to interact with the HMD and provide user input to the HMD, including, but not limited to, controlling and moving a virtual cursor, selection, movement and rotation of objects, scrolling, etc.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above. Furthermore, the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The invention is directed to a modular holding fixture for selectively coupling to a wireless hand-held inertial controller to provide passive optical and inertial tracking in a slim form-factor (sometimes hereinafter referred to as a "Controller" or "Controllers") for use with a HMD that operates with six degrees of freedom (6DOF) by fusing (i) data related to the position of the Controller derived from a forward-facing depth camera located in the HMD with (ii) data relating to the orientation of the Controller derived from an inertial measurement unit (IMU) located in the Controller.

In one embodiment, the apparatus can include: a housing having a first end and a second end; a first optically reflective marker at or proximate the first end of the housing; a second optically reflective marker at or proximate the second end of the housing; and a docking portion located on the housing between the first optically reflective marker and the second optically reflective marker, the docking portion having a size and shape that is complementary of the size and shape of the hand-held controller and is configured to selectively couple the hand-held controller to the holding fixture in a fixed spatial relationship relative to the first optically reflective marker and the second optically reflective marker.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 10 is a perspective view of another embodiment of a modular holding fixture for use with a wireless hand-held inertial controller.

DETAILED DESCRIPTION

Set forth below is an overview of a representative environment in which the apparatus and systems disclosed and/or claimed in this application can be implemented. It should be clearly understood and appreciated, however, that such descriptions are merely provided as an example of one representative environment and that the inventions described herein can be readily adapted to other HMD devices and AR and VR systems/environments, as well as other traditional computing environments and systems, including other conventional display devices.

Figure 1:
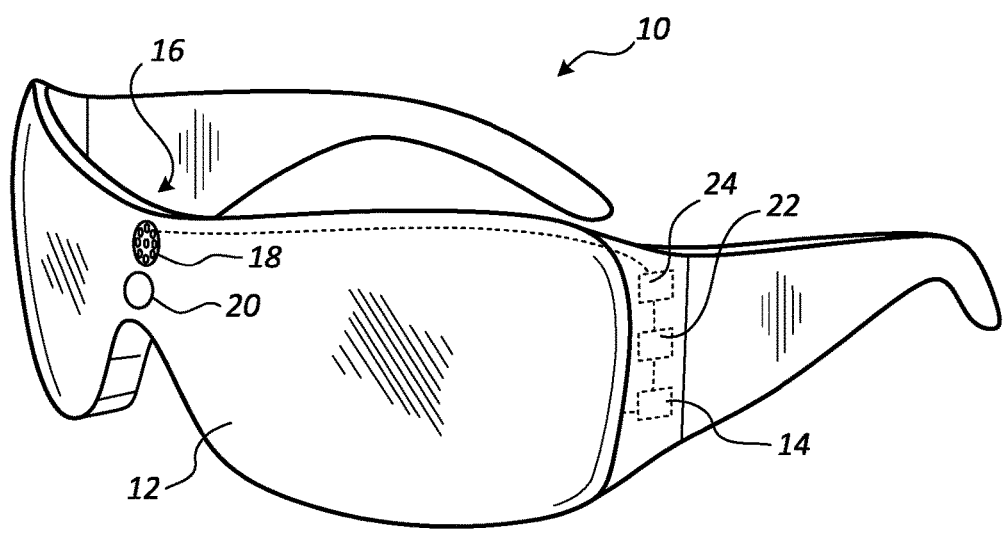
FIG. 1 is a schematic representation of one embodiment of a head mounted virtual or augmented reality display.
Figure 2:
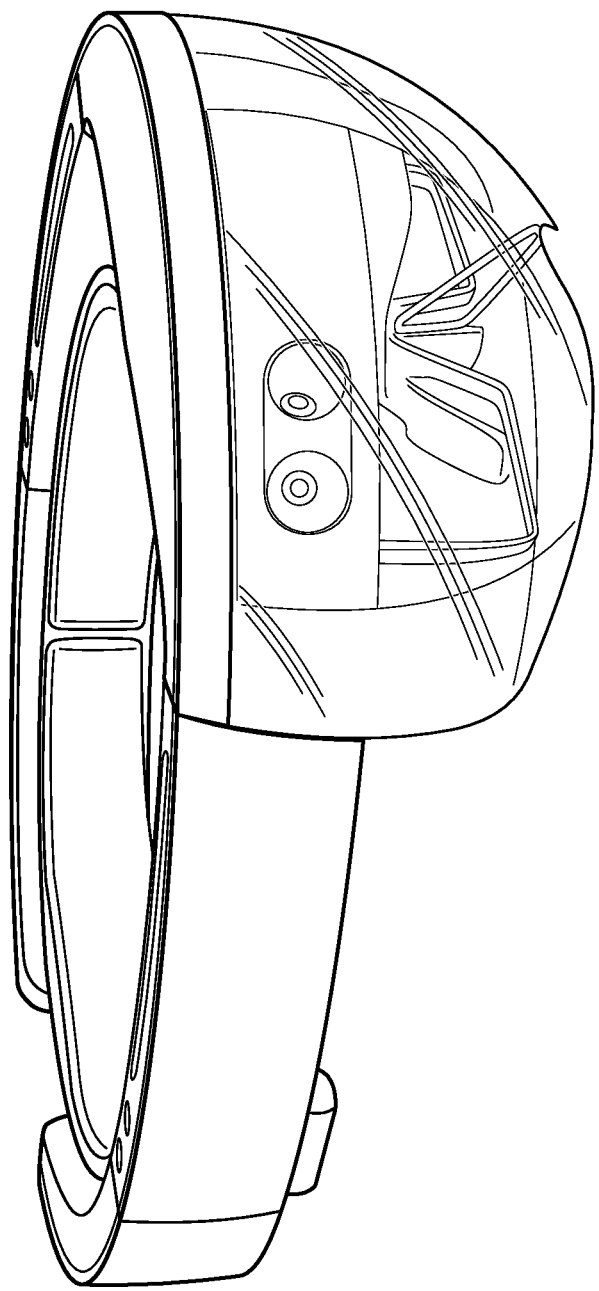
FIG. 2 is a general perspective rendering of one embodiment of the Microsoft Hololens.
Figure 3:
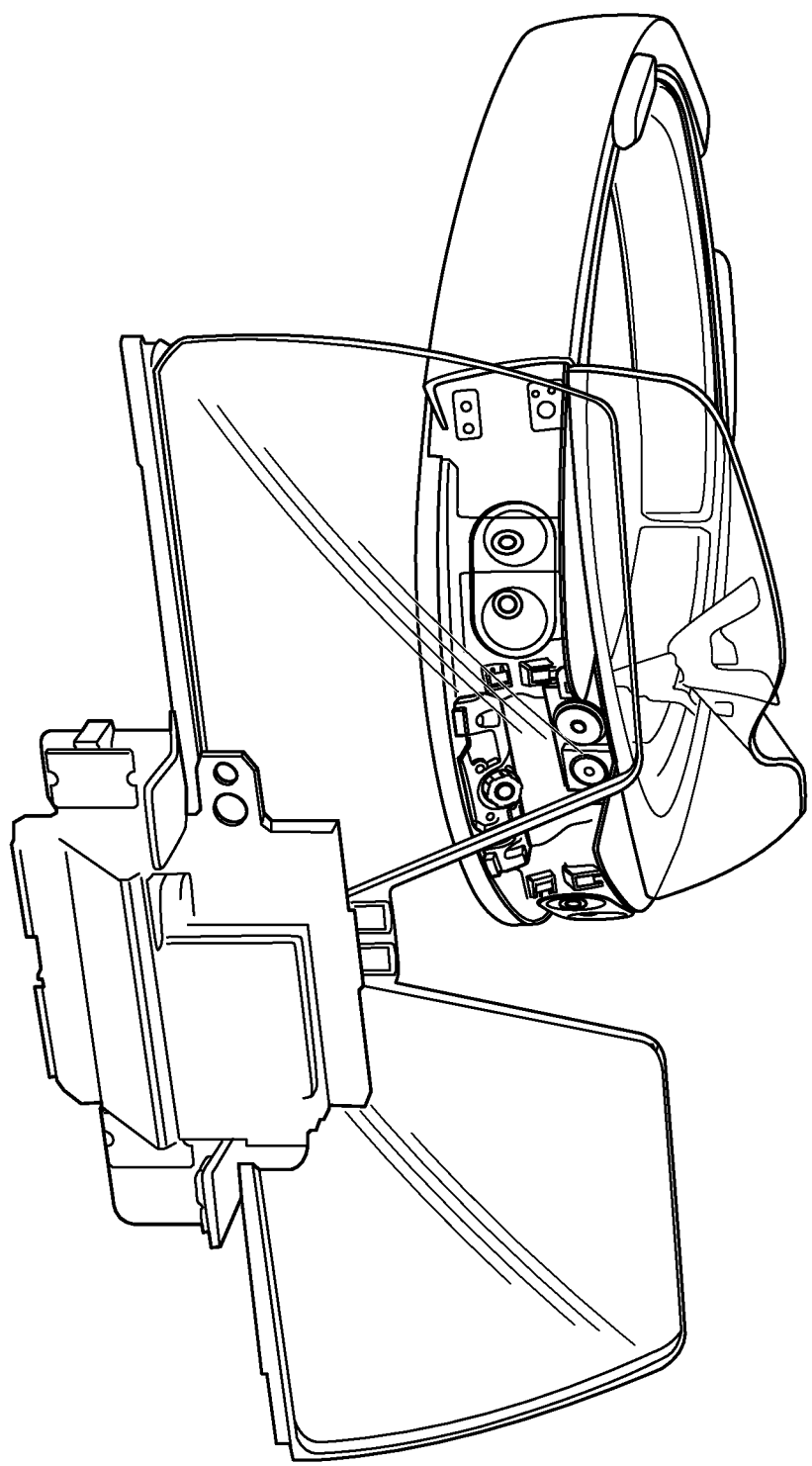
FIG. 3 is an exploded perspective rendering of one embodiment of the Microsoft Hololens, further illustrating one embodiment of a stereoscopic display system.
Figure 4:
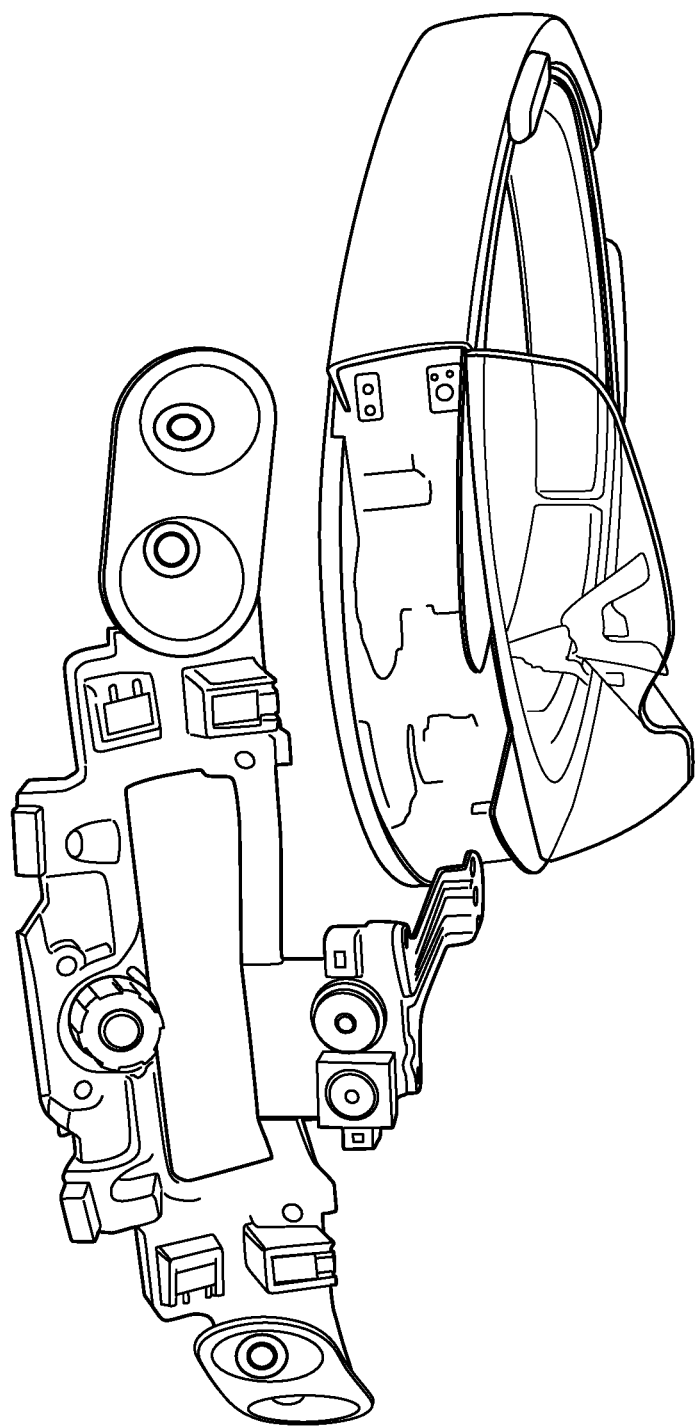
FIG. 4 is a general perspective rendering of one embodiment of the Microsoft Hololens, further illustrating one embodiment of an optical sensor system.
Figure 5:
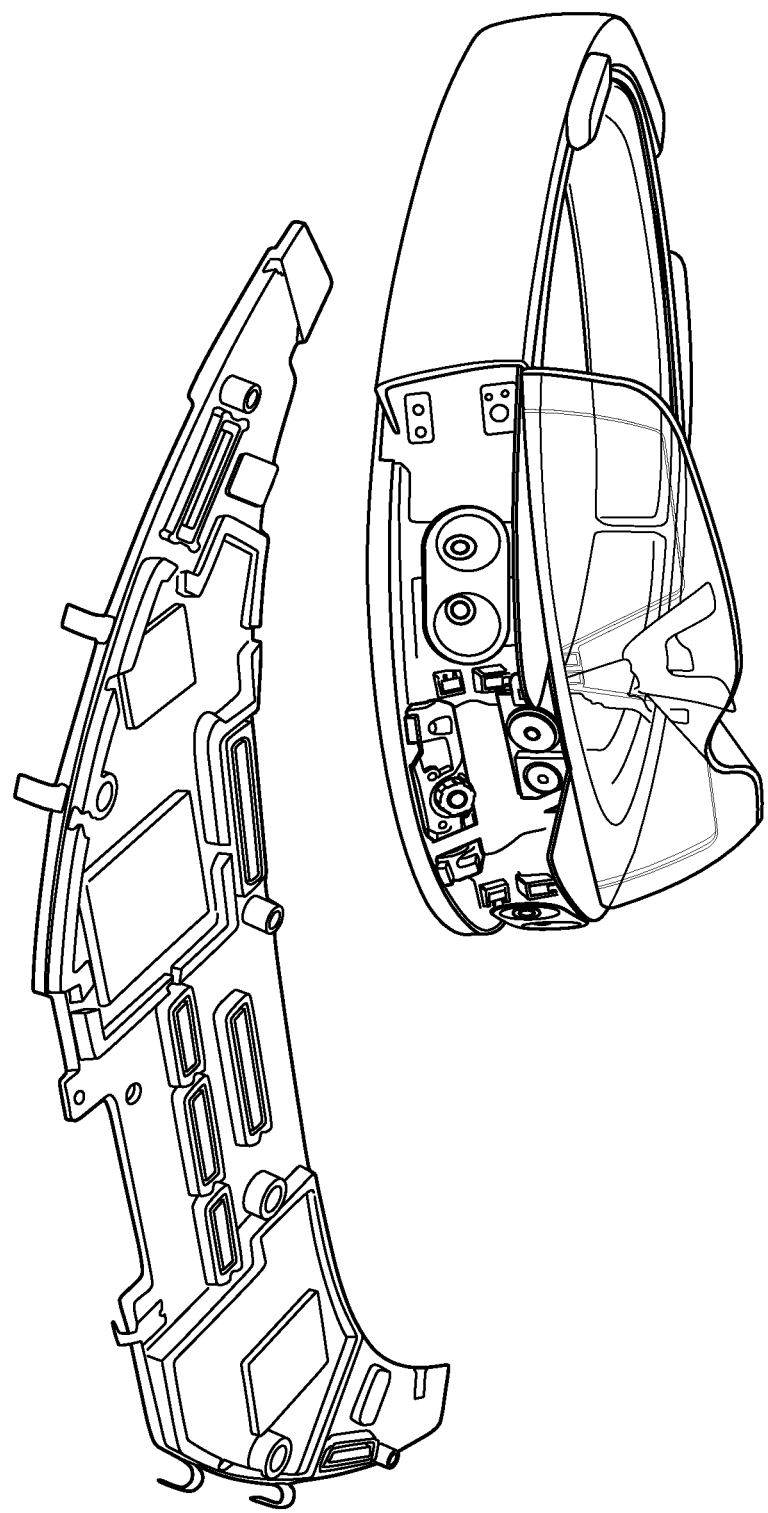
FIG. 5 is a general perspective rendering of one embodiment of the Microsoft Hololens, further illustrating one embodiment of a controller board and related on-board processors.

FIG. 1 schematically illustrates an example of a HMD device 10. FIGS. 2-5 are illustrations of the Microsoft Hololens, which represents one recent embodiment of a HMD.

Referring to FIGS. 1-5 generally, a HMD device 10 takes the form of wearable glasses or goggles, but it will be appreciated that other forms are possible. The HMD device 10 may be configured in an augmented reality configuration to present an augmented reality environment, and thus may include an at least partially see-through stereoscopic display 12 that may be configured to visually augment an appearance of a physical environment being viewed by the user through the at least partially see-through stereoscopic display 12. In some examples, the at least partially see-through stereoscopic display 12 may include one or more regions that are transparent (e.g., optically clear) and may include one or more regions that are opaque or semi-transparent. In other examples, the at least partially see-through stereoscopic display 12 may be transparent (e.g., optically clear) across an entire usable display surface of the stereoscopic display 12. Alternatively, the HMD device 10 may be configured in a virtual reality configuration to present a full virtual reality environment, and thus the stereoscopic display 12 may be a non-see-though stereoscopic display. The HMD device 10 may be configured to display virtual three dimensional environments to the user via the non-see-through stereoscopic display. The HMD device 10 may be configured to display a virtual representation such as a three dimensional graphical rendering of the physical environment in front of the user that may include additional virtual objects or may be configured to display camera-captured images of the physical environment along with additional virtual objects including the virtual cursor overlaid on the camera-captured images.

For example, the HMD device 10 may include an image production system 14 that is configured to display virtual objects to the user with the stereoscopic display 12. In the augmented reality configuration with an at least partially see-through display, the virtual objects are visually superimposed onto the physical environment that is visible through the display so as to be perceived at various depths and locations. In the virtual reality configuration, the image production system 14 may be configured to display virtual objects to the user with the non-see-through stereoscopic display, such that the virtual objects are perceived to be at various depths and locations relative to one another. In one embodiment, the HMD device 10 may use stereoscopy to visually place a virtual object at a desired depth by displaying separate images of the virtual object to both of the user's eyes. Using this stereoscopy technique, the HMD device 10 may control the displayed images of the virtual objects, such that the user will perceive that the virtual objects exist at a desired depth and location in the viewed physical environment. In one example, the virtual object may be a virtual cursor that is displayed to the user, such that the virtual cursor appears to the user to be located at a desired location in the virtual three dimensional environment. In the augmented reality configuration, the virtual object may be a holographic cursor that is displayed to the user, such that the holographic cursor appears to the user to be located at a desired location in the real world physical environment.

The HMD device 10 includes an optical sensor system 16 that may include one or more optical sensors. In one example, the optical sensor system 16 includes an outward facing optical sensor 18 that may be configured to detect the real-world background from a similar vantage point (e.g., line of sight) as observed by the user through the at least partially see-through stereoscopic display 12. The optical sensor system 16 may additionally include an inward facing optical sensor 20 that may be configured to detect a gaze direction of the user's eye. It will be appreciated that the outward facing optical sensor 18 may include one or more component sensors, including an RGB camera and a depth camera. The RGB camera may be a high definition camera or have another resolution. The depth camera may be configured to project non-visible light, such as infrared (IR) radiation, and capture reflections of the projected light, and based thereon, generate an image comprised of measured depth data for each pixel in the image. This depth data may be combined with color information from the image captured by the RGB camera, into a single image representation including both color data and depth data, if desired. In a virtual reality configuration, the color and depth data captured by the optical sensor system 16 may be used to perform surface reconstruction and generate a virtual model of the real world background that may be displayed to the user via the display 12. Alternatively, the image data captured by the optical sensor system 16 may be directly presented as image data to the user on the display 12.

The HMD device 10 may further include a position sensor system 22 that may include one or more position sensors, such as one or more inertial measurement unit (IMU) that incorporates a 3-axis accelerometer, 3-axis gyroscope and/or a magnetometer, global positioning system(s), multilateration tracker(s), and/or other sensors that output position sensor information useable as a position, orientation, and/or movement of the relevant sensor.

Optical sensor information received from the optical sensor system 16 and/or position sensor information received from position sensor system 22 may be used to assess a position and orientation of the vantage point of HMD device 10 relative to other environmental objects. In some embodiments, the position and orientation of the vantage point may be characterized with six degrees of freedom (e.g., world-space X, Y, Z, ($\theta_{pitch}$, $\theta_{yaw}$ and $\theta_{roll}$). The vantage point may be characterized globally or independent of the real-world background. The position and/or orientation may be determined with an on-board computing system (e.g., on-board computing system 24) and/or an off-board computing system. Typically, frames of reference of all sensors located on board HMD device 10 are factory aligned and calibrated to resolve six degrees of freedom relative to world-space.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Additionally, the optical sensor information received from the optical sensor system 16 may be used to identify and track objects in the field of view of optical sensor system 16. For example, depth data captured by optical sensor system 16 may be used to identify and track motion of a user's hand. The tracked motion may include movement of the user's hand in three-dimensional space, and may be characterized with six degrees of freedom (e.g., world-space X, Y, Z, $\theta_{pitch}$, $\theta_{yaw}$ and $\theta_{roll}$). The tracked motion may also be used to identify and track a hand gesture made by the user's hand. For example, one identifiable hand gesture may be moving a forefinger upwards or downwards. It will be appreciated that other methods may be used to identify and track motion of the user's hand. For example, optical tags may be placed at known locations on the user's hand or a glove worn by the user, and the optical tags may be tracked through the image data captured by optical sensor system 16.

It will be appreciated that the following examples and methods may be applied to both a virtual reality and an augmented reality configuration of the HMD device 10. In a virtual reality configuration, the display 12 of the HMD device 10 is a non-see-through display, and the three dimensional environment is a virtual environment displayed to the user. The virtual environment may be a virtual model generated based on image data captured of the real-world background by optical sensor system 16 of the HMD device 10.

Microsoft Hololens.

One example of a HMD is the Microsoft Hololens, which is a pair of mixed reality head-mounted smartglasses. Hololens has see-through holographic lenses that use an advanced optical projection system to generate multi-dimensional full-color holograms with very low latency so a user can see holographic objects in a real world setting.

Located at the front of the Hololens are sensors and related hardware, including cameras and processors. The Hololens also incorporates an inertial measurement unit (IMU), which includes an accelerometer, gyroscope, and a magnetometer, four "environment understanding" sensors, an energy-efficient depth camera with a 120°×120° angle of view, a forward-facing 2.4-megapixel photographic video camera, a four-microphone array, and an ambient light sensor. Hololens contains advanced sensors to capture information about what the user is doing and the environment the user is in. The built in cameras also enable a user to record (mixed reality capture (MRC)) HD pictures and video of the holograms in the surrounding world to share with others.

Enclosed within the visor is a pair of transparent combiner lenses, in which the projected images are displayed in the lower half. The Hololens must be calibrated to the interpupillary distance (IPD), or accustomed vision of the user.

Along the bottom edges of the side, located near the user's ears, are a pair of small, 3D audio speakers. The speakers do not obstruct external sounds, allowing the user to hear virtual sounds, along with the environment. Using head-related transfer functions, the Hololens generates binaural audio, which can simulate spatial effects; meaning the user, virtually, can perceive and locate a sound, as though it is coming from a virtual pinpoint or location.

On the top edge are two pairs of buttons: display brightness buttons above the left ear, and volume buttons above the right ear. Adjacent buttons are shaped differently—one concave, one convex—so that the user can distinguish them by touch.

At the end of the left arm is a power button and row of five, small individual LED nodes, used to indicate system status, as well as for power management, indicating battery level and setting power/standby mode. A USB 2.0 micro-B receptacle is located along the bottom edge. A 3.5 mm audio jack is located along the bottom edge of the right arm.

In addition to a central processing unit (CPU) and graphics processing unit (GPU), Hololens features a custom-made Microsoft Holographic Processing Unit (HPU), a coprocessor manufactured specifically for the Hololens. The main purpose of the HPU is processing and integrating data from the sensors, as well as handling tasks such as spatial mapping, gesture recognition, and voice and speech recognition. The HPU processes terabytes of information from the Hololens's sensors from real-time data.

The lenses of the Hololens use optical waveguides to color blue, green, and red across three different layers, each with diffractive features. A light engine above each combiner lens projects light into the lens, a wavelength which then hits a diffractive element and is reflected repeatedly along a waveguide until it is output to the eye. Similar to that of many other optical head-mounted displays, the display projection for the Hololens occupies a limited portion of the user's field of view (FOV), particularly in comparison to virtual reality head-mounted displays, which typically cover a much greater field of view.

The Hololens contains an internal rechargeable battery, but can be operated while charging. Hololens also features IEEE 802.11ac Wi-Fi and Bluetooth 4.1 Low Energy (LE) wireless connectivity.

With Hololens a user can create and shape holograms with gestures, communicate with apps using voice commands, and navigate with a glance, hand gestures, Controllers and/or other pointing devices. Hololens understands gestures, gaze, and voice, enabling the user to interact in the most natural way possible. With spatial sound, Hololens synthesizes sound so the user can hear holograms from anywhere in the room, even if they are behind the user.

Additional details about the Hololens are provided in U.S. Patent Application Ser. No. 62/029,351, filed Jul. 25, 2014, and entitled "Head Mounted Display Apparatus," which is incorporated herein by reference.

As mentioned above, the Hololens includes a depth camera, which is capable of detecting the 3D location of objects located within the depth camera's FOV. Technical details of exactly how the depth camera accomplishes such detection are known to those skilled in the art, but are not necessary for the present disclosure. Suffice it to say that the depth camera is able to accurately detect, on a pixel-by-pixel basis, the exact 3D location of each point on a physical object within the camera's field of view. While the Hololens uses a depth camera, stereoscopic optics can also be used to detect the distance of objects from the HMD and the locations of such objects in 3D space via triangulation. In either event, such sensors can detect the 3D location (x, y and z coordinates) of real objects located within the FOV relative to the HMD. In the case of a Controller, the depth camera of the HMD can be used to detect the 3D location of the Controller relative to the HMD.

Wireless Hand-Held Controller.

As previously mentioned, the Hololens has the ability to track the movement of a user's hands through space and to identify and interpret a variety of hand poses, gestures and movements to manipulate virtual objects in the AR space. Additional details regarding hand tracking, hand gesture identification, classification and recognition and/or hand pose identification, classification and recognition are provided in U.S. patent application Ser. No. 12/975,086, filed Dec. 21, 2010 and entitled "Skeletal Control of Three-Dimensional Virtual World," U.S. patent application Ser. No. 13/327,098, filed Dec. 15, 2011 and entitled "Problem States for Pose Tracking Pipeline," U.S. patent application Ser. No. 13/959,555, filed Aug. 5, 2013 and entitled "Two-Hand Interaction with Natural User Interface," and/or U.S. patent application Ser. No. 14/748,646, filed Jun. 24, 2015 and entitled "Contextual Cursor Display Based on Hand Tracking," each of which is incorporated herein by reference.

One of the challenges with hand tracking and gesture recognition, however, is that they can require a relatively high level of processing overhead. To reduce such overhead, it can be useful to provide a wireless, hand-held controller that can communicate with the HMD and allow manipulation of objects in the AR space. For example, in the case of Hololens, the headset uses Bluetooth LE to pair with a wireless, hand-held inertial controller, called a "Clicker," a thumb-sized finger-operated input device that can be used to enable the user to select, scroll, hold, and double-click to interact with virtual objects within the augmented reality space.

Typically, when a Clicker is first powered on, it typically establishes a connection with Hololens via a predetermined wireless protocol, typically via Bluetooth pairing. Once a connection is established, the Clicker is assigned a unique controller ID by Hololens. In that way, all orientation data and user inputs received from a particular Clicker can be specifically associated with that controller.

Figure 6:
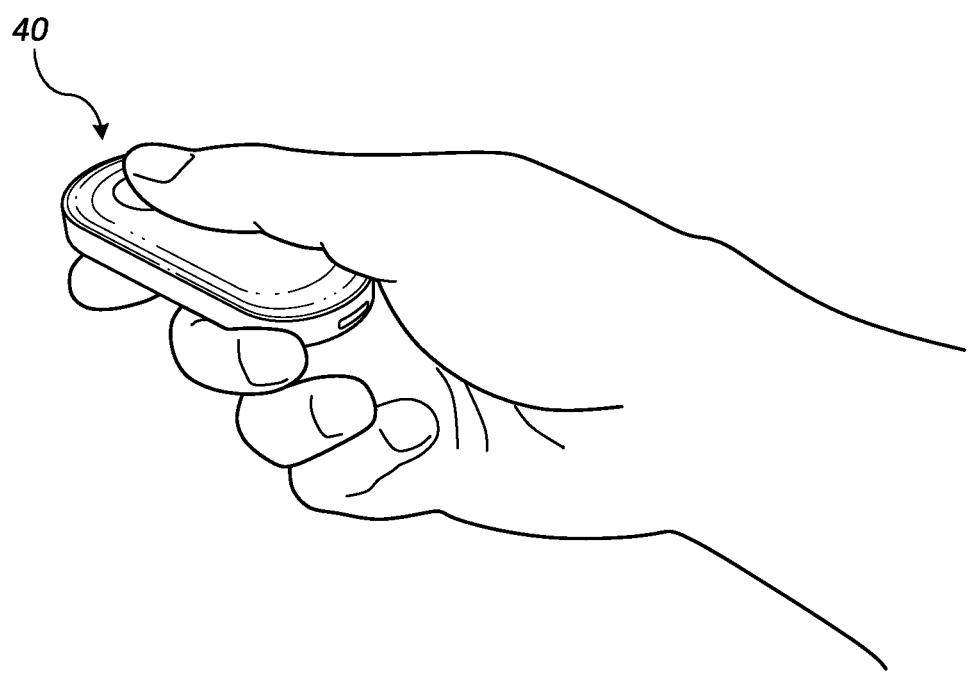
FIG. 6 is a perspective rendering of one embodiment of a wireless hand-held inertial controller.
Figure 7:
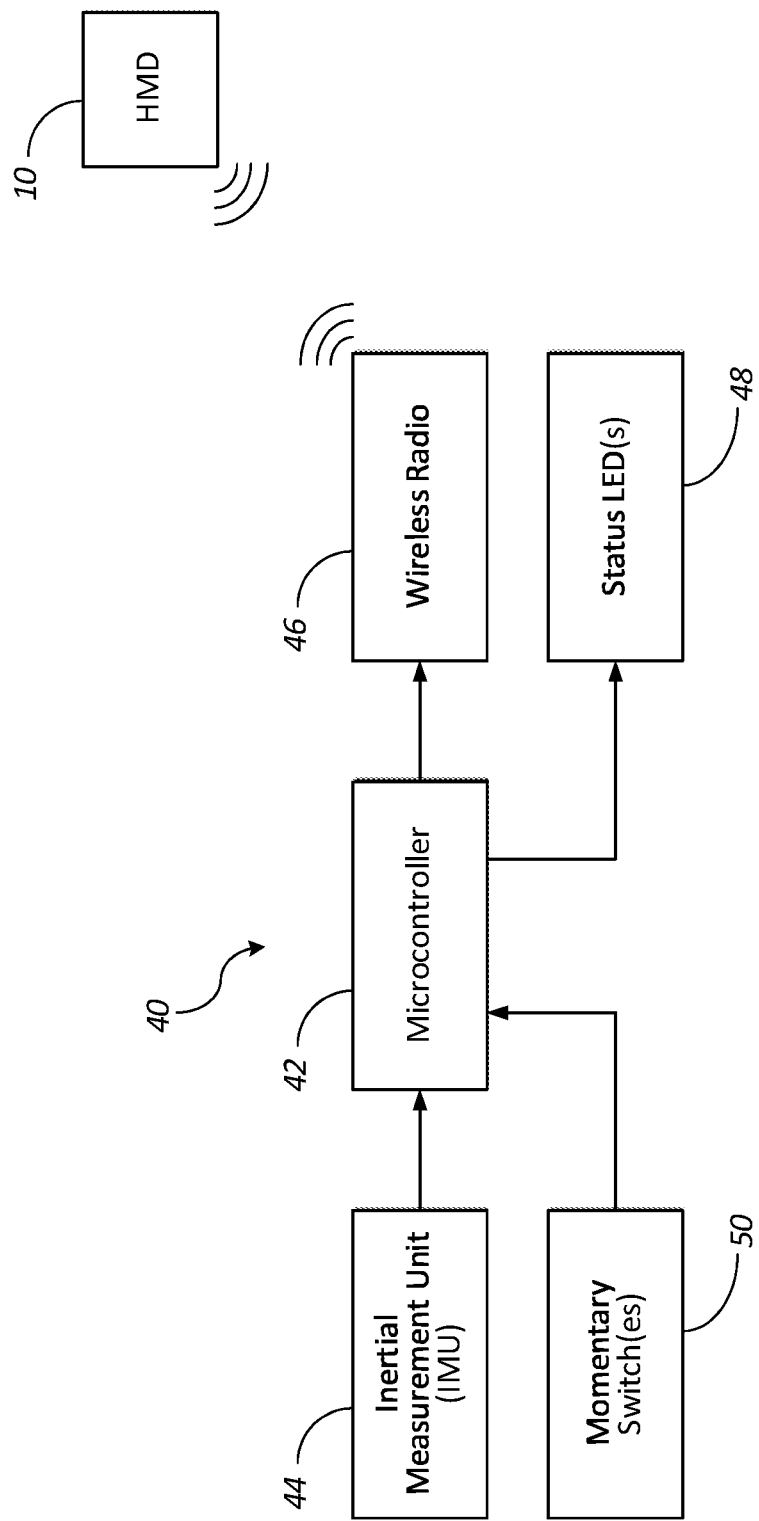
FIG. 7 is a functional block diagram illustrating the basic components of one embodiment of a wireless hand-held inertial controller.

Referring to FIGS. 6 and 7, Controller 40 can include an on-board microcontroller 42, its own IMU 44, a communications radio 46, a rechargeable battery (not shown), and one or more status LEDs 48. The IMU typically includes a 3-axis accelerometer and a 3-axis gyroscope, and may also include a magnetometer. User inputs and orientation data (pitch, yaw and roll) derived from the IMU can be wirelessly communicated by the microcontroller 42 to the CPU of the HMD 10 via wireless radio 46. Controller 40 can also include one more momentary switch(es) 50 for selective activation by the user to control a virtual cursor and/or to manipulate virtual objects in various ways (such as, for example, select, move, rotate, scroll, etc.). Controller 40 can also include an elastic finger loop (for holding the device) and a USB 2.0 micro-B receptacle for charging the internal battery.

From the accelerometer and gyroscope, the IMU 44 can detect the orientation of the Controller 40, but only with three degrees of freedom, namely, pitch (elevation angle), yaw (azimuth angle) and roll (rotation). Because the accelerometer can detect the gravity vector, the vertical axis of the frame of reference of the Controller 40 is easily identified and aligned. Similarly, the gyroscopes of the IMU 44 can readily detect the horizontal plane and, therefore, the horizontal plane is readily identified and aligned. If the IMU 44 also includes a magnetometer, then magnetic north can readily be identified and the frame of reference of the Controller 40 can be north aligned. If both the IMU of the HMD 10 and the IMU 44 of the Controller 40 include a magnetometer, then the frame of reference of the Controller 40 will automatically be aligned with the HMD's frame of reference (subject to some minor variations/offset and drift, which can be corrected over time).

If the IMU 44 of the Controller 40 does not include a magnetometer, then the IMU 44 arbitrarily assigns an x-axis when it powers up and then continuously tracks azimuth changes (angular rotation in the horizontal plane) from that initial frame of reference. In that case, the frame of reference of the Controller 40 will need to be aligned with or calibrated to the HMD's frame of reference, as discussed in more detail below.

At this point it bears repeating that the foregoing description of the Hololens and Clicker are provided merely as examples of a system and environment in which the systems and methods disclosed and/or claimed herein can be implemented. The inventions described herein can be readily adapted to other HMD devices and AR and VR systems/environments, as well as other traditional computing systems and environments, including other conventional display devices.

Figure 8:
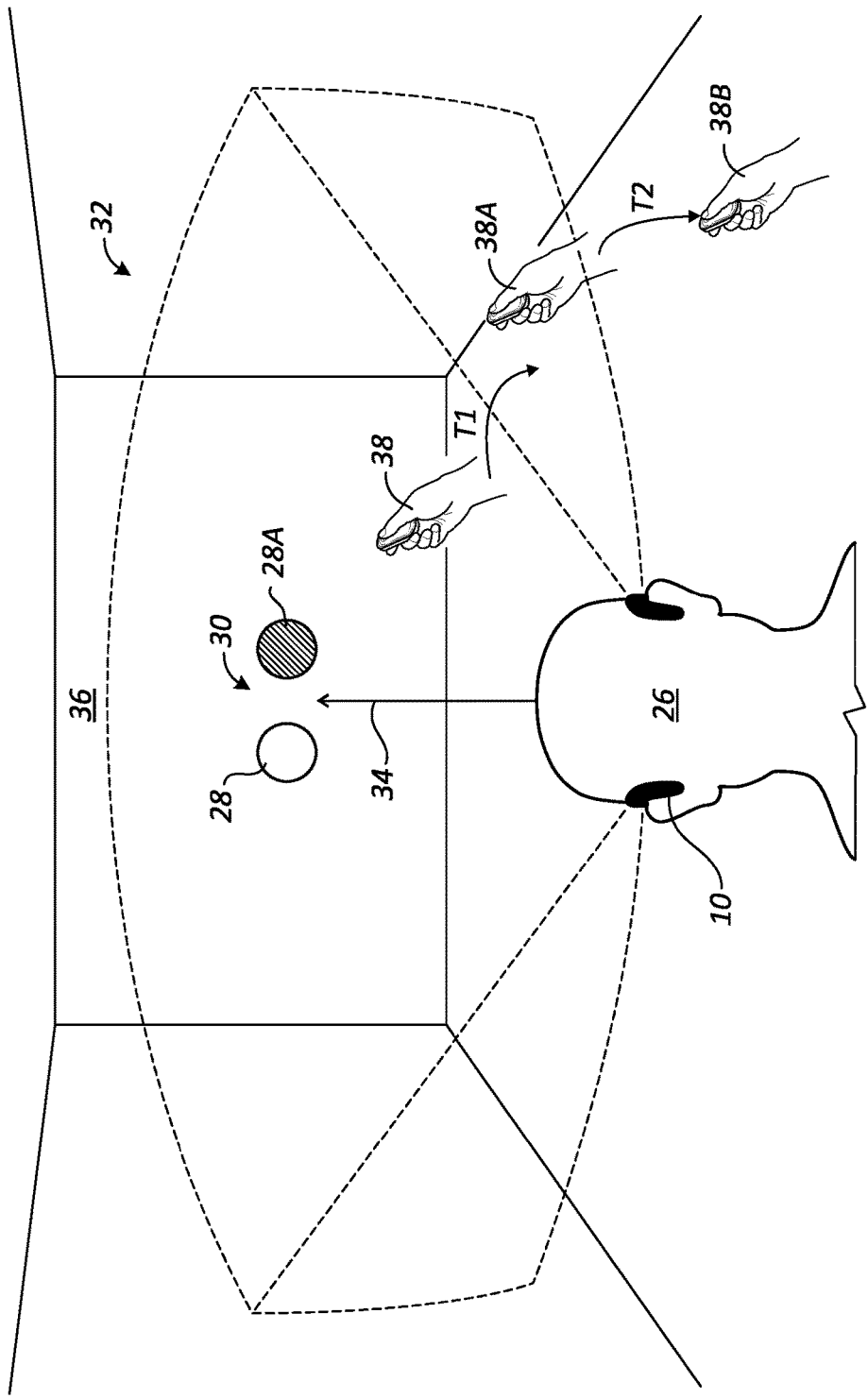
FIG. 8 is a graphical representation of one example of a possible field of view of one embodiment of an augmented reality display.

FIG. 8 illustrates an augmented reality configuration of a HMD device 10 worn by a user 26, displaying a virtual cursor, which is a holographic cursor 28 in this example, on the at least partially see-through stereoscopic display 12 so as to appear to at a location 30 in a three dimensional environment 32. In the specific example shown in FIG. 8, the three dimensional environment 32 is a room in the real world, and the holographic cursor 28 is displayed on the at least partially see-through stereoscopic display such that the holographic cursor 28 appears to the user 26, to be hovering in the middle of the room at the location 30. It will be appreciated that the location 30 for the holographic cursor 28 may be calculated based on a variety of suitable methods. For example, the location 30 may be calculated based on a predetermined distance and orientation relative to the user 26, such as being two feet in front of the user 26 as one specific example.

As another non-limiting example, the location 30 may be calculated based on a detected gaze direction 34 and a recognized object that intersects with the detected gaze direction. In this example, the recognized object may be a real object in the three dimensional environment. This example is illustrated in FIG. 8, with the recognized object being the wall 36 that is a part of the room that serves as the three dimensional environment 32. Accordingly, the intersection between the wall 36 and the detected gaze direction 34 of the user 26 may be used to calculate the location 30 for the holographic cursor 28. It may be advantageous to further ensure that the holographic cursor 28 is displayed to the user 26, such that the holographic cursor 28 is easily visible to the user 26. For example, to increase visibility, the location 30 of the holographic cursor 28 may be placed a threshold distance away from the recognized object to prevent the holographic cursor 28 from being occluded by any protrusions of the recognized object. Additionally, it may be advantageous to further calculate the location 30 of the holographic cursor 28 based on a plane that is orthogonal to the detected gaze direction 34 of the user 26. By placing the location 30 of the holographic cursor 28 on such a plane, a consistent view of the holographic cursor 28 may be maintained even as the user changes gaze direction.

Additionally, in the example illustrated in FIG. 8, the HMD device 10 worn by the user 26 may be configured to detect motion of the user's hand. Based on a series of images captured by the optical sensor system 16, the HMD device 10 may determine whether motion of hand 38 of the user 26 is trackable. For example, the user's hand at positions 38 and 38A are within the field of view of the optical sensor system 16. Accordingly, motion of the user's hand moving from position 38 to position 38A over time T1 is trackable by the HMD device 10. However, as position 38B may be outside of the field of view of the optical sensor system 16, motion of the user's hand moving from position 38A to position 38B over time T2 may not be trackable by the HMD device 10. It will be appreciated that the user's hand is determined to be trackable by the HMD when the HMD can monitor the hand for gesture input. Thus, the user's hand is deemed to be trackable, for example, when computer algorithms implemented in software executed on the processor of the HMD device 10 identify the hand in images captured by the onboard camera and begin tracking the hand, until a point in time at which those algorithms lose track of the hand. Techniques that may be used to track the hand the hand include searching for regions of similar color values and segmenting a portion of the image based on the color values from the rest of the image, as well as searching for regions of pixels that have changed, indicating foreground movement by a hand or other object. When depth information is available, the hand may be located using skeletal tracking techniques in addition or as an alternative to the above. A hand may be determined to be trackable when a confidence degree output by the algorithm indicates that the hand is being tracked with above a predetermined threshold level of confidence.

In the above embodiment, the HMD device 10 communicates to the user whether motion of the user's hand is trackable. In this embodiment, in response to at least determining that motion of the hand is trackable, the HMD device 10 modifies the visual appearance of the holographic cursor to indicate that motion of the hand is trackable. In the example illustrated in FIG. 8, the visual appearance of the holographic cursor is modified to appear as holographic cursor 28, which is an unfilled circle. Accordingly, as the user moves the hand from position 38 to position 38A over time T1, the user is shown holographic cursor having visual appearance 28 and is thus provided with the feedback that motion of the user's hand is currently trackable, and any hand gestures or hand movements will be tracked by the HMD device 10.

Further in this embodiment, in response to at least determining that motion of the hand is not trackable, the HMD device 10 modifies the visual appearance of the holographic cursor to indicate that motion of the hand is not trackable. As illustrated in FIG. 8, the visual appearance of the holographic cursor may be modified to appear as holographic cursor 28A, which has a different visual appearance than holographic cursor 28. In this example, the visual appearance of holographic cursor 28A is a filled circle. Accordingly, as the user moves the hand from position 38A to position 38B over time T2, the user is shown holographic cursor having visual appearance 28A and is thus provided with the feedback that motion of the user's hand is not currently trackable. It will be appreciated that while the example illustrated in FIG. 8 modifies the visual appearance of the holographic cursor to appear as a filled or unfilled circle, any suitable visual modification is possible. As a few other non-limiting examples, the visual appearance of the holographic cursor may be modified by changing a color, changing a shape, adding or removing an icon, or changing a size of the holographic cursor.

Wireless Hand-Held Controller with Passive Optical and Inertial Tracking in a Slim Form-Factor.

While the wireless controllers found in the prior art, including the Clicker, may provide orientation information with 3DOF, they do not provide location information. While hand tracking and skeletal segmentation can be combined with orientation data derived from a hand-held inertial controller to recover up to five degrees of freedom, such processes can typically require a high level of processing overhead. In addition, even with hand tracking and skeletal segmentation it can be difficult to distinguish subtle movements of the controller, particularly subtle rotational movements. In accordance with the apparatus and systems described below, it is possible to recover 6DOF with a high degree of resolution and accuracy and with reduced processing overhead.

As described in more detail below, one aspect of the invention is to provide a modular extension or holding fixture configured to couple with the Clicker controller or other hand-held inertial controller, and which extends and augments the existing inertial track capabilities of existing Clicker devices by adding passive optical location tracking capabilities, which then allows the Clicker to operate with 6DOF.

In addition to combining optical position tracking and inertial orientation tracking of a hand-held device, processing overhead can be further reduced by providing an alternate approach to identifying the location of the hand-held controller other than hand tracking and gesture recognition. In one embodiment, the hand-held controller can include an elongate form factor with a pair of passive IR markers positioned at or near each end of the controller. When combined with a source of IR radiation and an IR depth camera positioned on the HMD, the IR markers can provide an advantageous way to locate the position of the hand-held controller in 3D space, as well as provide additional orientation data that can be combined with the orientation data derived from the IMU incorporated into the hand-held controller. The use of an elongate form factor and two or more IR markers provides various advantages discussed in more detail below.

In one embodiment, the system is used to interact in virtual and augmented reality worlds experienced through HMD devices. In another embodiment, the display is external. In other words, the inventions described herein can be readily adapted to other HMD devices and AR and VR systems/environments, as well as other traditional computing systems and environments, including other conventional display devices.

In one embodiment, the modular holding fixture has a stylus shape 64, 66 with two spherical reflective markers 68, 70 at each end. Controller 40 has an IMU 40 on-board, microcontroller 42 communication radio 46, and buttons 50 (e.g., momentary switches) as shown in FIG. 7. This form factor brings several critical advantages that makes this solution feasible. First, the form factor establishes a wide baseline between the two markers, which improves detection, segmentation, and precise estimation of the orientation of the segment connecting the two markers with high resolution. Second, at least one of the markers is visible by the optical sensor across a full range of hand orientations. With only one optical marker, a single optical marker can easily be blocked by the hand from view of the HMD within the normal range of hand movements. With two, separated markers, at least one marker will usually be visible to the HMD camera at all times.

Figure 9:
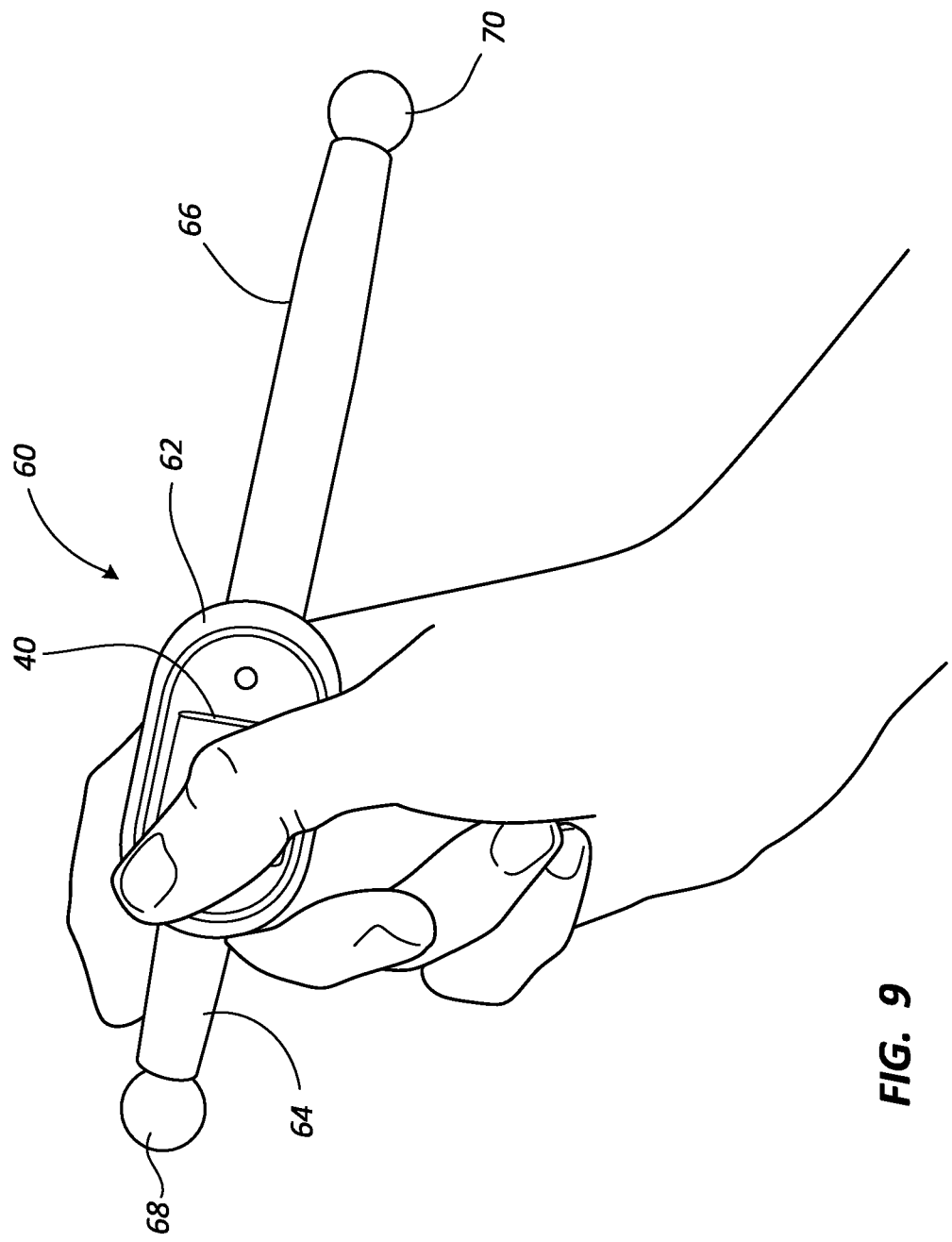
FIG. 9 is a perspective view of one embodiment of a modular holding fixture for use with a wireless hand-held inertial controller.

Referring now to FIG. 9, which illustrates one embodiment of the invention, which can include a modular holding fixture 60 designed to selectively and securely couple with a Clicker controller or other similar inertial controller 40 (hereinafter sometimes referred to simply as "Controller 40"). As shown, the modular holding fixture 60 can include a central coupling portion 62 that is sized and shaped so as to selectively, securely, and removably receive a portion of the housing of Controller 40 in a close fit, coupling relationship. The central coupling portion 62 can also be configured to provide access to the various components and control surfaces of the Controller 40, such as the momentary switch, status LED, the charging port, etc.

Central coupling portion 62 can also include a first elongate extension 64 extending from one end of central coupling portion 62. Central coupling portion 62 can also include a second elongate extension 66 extending from the other end of central coupling portion 62. First elongate extension 64 can include a first passive, optically reflective marker 68 located at or proximate the distal end of first elongate extension 64, and second elongate extension 66 can include a second passive, optically reflective marker 70 located at or proximate the distal end of second elongate extension 66.

In one embodiment, extensions 64 and 66 are positioned along a common longitudinal axis and separated by a fixed, predetermined distance. This, together with the fixed relationship of extensions 64 and 66 relative to the central coupling portion 62 provides a fixed and known geometrical relationship between the Controller 40 and markers 68, 70. The following discussion assumes a linear alignment of extensions 64 and 66. However, extensions 64 and 66 can be positioned in other configurations relative to one another and/or relative to the central coupling portion 62. The specific configuration is not limiting as long as the components remain fixed with respect to one another and the specific, fixed dimensions and relative positions are known.

As illustrated in FIG. 10, the shape or form-factor of holding fixture 60 is otherwise unconstrained, allowing for design and production of a diverse physical props (e.g., pen, gun, rifle, sports equipment, etc.) that can be used, interchangeably, with a single clicker. FIG. 10 shows a schematic representation of the modular holder 60 in the general shape of a pistol with an integrated pistol grip. In this manner, various form factors can be designed and manufactured at a reduced cost. Thus, the Controller 40 is reusable and transferable from one form factor to another.

In addition, the holding fixture 60 be can custom designed based on specific, desired physical constraints, including, the separation distance between markers, axis registration between Controller 40 and holding fixture 60, etc. Further still, the holding fixture 60 can be designed for and/or fabricated by 3D printing devices.

In another embodiment, the holding fixture can be active and include additional elements that further extends the existing functionality of the Controller, such as, for example, haptic, visual, audio feedback (speakers), wireless communication, selfie camera, extended battery, and other similar elements and/or functionality.

In yet another embodiment, the button press can be mechanically transferred from one location on the holding fixture 60 to the actual button on the Clicker using levers, springs, or other mechanical linkages. For example, in a gun form-factor, the user could trigger with the index finger instead of the thumb. If not mechanical, the holding fixture 60 can also have its own button and own communications layer for communicating user input to the Controller 40 and/or the HMD device 10.

As mentioned above, Controller 40 includes an IMU 44. From the accelerometer and gyroscope, the IMU 44 can detect the orientation of the Controller 40, but only with three degrees of freedom, namely, pitch (elevation angle), yaw (azimuth angle) and roll (rotation). Because the accelerometer can detect the gravity vector, the vertical axis of the frame of reference of the Controller 40 is easily identified and aligned. Similarly, the gyroscope of the IMU 44 can readily detect the horizontal plane and, therefore, the horizontal plane is readily identified and aligned. If the IMU 44 also includes a magnetometer, then magnetic north can readily be identified and the frame of reference of the Controller 40 can be north aligned. If both the IMU of the HMD 10 and the IMU 44 of the Controller 40 include a magnetometer, then the frame of reference of the Controller 40 will automatically be aligned with the HMD's frame of reference (subject to some minor variations/offset and drift, which can be corrected over time).

If the IMU 44 of the Controller 40 does not include a magnetometer, then the IMU 44 arbitrarily assigns an x-axis when it powers up and then continuously tracks azimuth changes (angular rotation in the horizontal plane) from that initial frame of reference. In that case, the frame of reference of the Controller 40 will need to be aligned with or calibrated to the HMD's frame of reference, as discussed in more detail below.

As previously discussed, an IMU comprises a combination of accelerometers and gyroscopes, plus optionally magnetometers. The data from IMU 44 can be fused to compute with high frequency and low latency the orientation of the Controller 40 relative to some initial reference frame that is gravity aligned. In addition, if the IMU 44 includes a magnetometer, the magnetometer will automatically north align the Controller's frame of reference with HMD's frame of reference and will also reduce azimuth draft.

By combining the Controller 40 with the modular holding fixture 60, including reflective markers 68 and 70, it is possible to accurately track the position of Controller 40. The optical sensor system 16 of the HMD 10 tracks the position of the markers 68, 70 in 3D. Optical sensor system 16 can include an illumination source to light up the passive reflective markers 68, 70, and an imaging sensor. In one embodiment, the illumination source radiates IR radiation and the optical sensor uses an active IR depth camera to detect and directly estimate the position of the markers 68, 70 in 3D. Even though the markers are highly reflective for easy segmentation in the IR shutter images, it is still possible for the depth camera to compute depth at each pixel. In another embodiment, a stereo IR camera pair can be used to triangulate the 3D positions of markers 68, 70.

In one embodiment, the markers 68, 70 are visually hidden behind IR transmissive material, blocking light in the visible spectrum, but allowing light to pass through in the IR operating range of the optical sensor. In this way, the optical markers can be hidden from view, without limiting the functionality described herein, so that modular holding fixture 60 (either alone or in combination with a coupled Controller 40) can assume the shape of many different objects, such as, for example, a stylus, a wand or a variety of objects typically used in VR gaming (e.g., gun, rifle, sword, sports equipment, etc.) for which precise detection of location and orientation of the object (fixture 60 and/or Controller 40) can be very important.

The optical tracking system 16 is typically mechanically related to the display frame of reference of the HMD 10 through a rigid transform, which is refined through calibration. Without loss of generality, the HMD device 10 is assumed to be in a gravity-aligned frame of reference, through use of IMUs and/or other environment tracking sub-systems (e.g., head tracking component in an HMD).

When the optical system 16 of the HMD 10 detects an optically reflective marker (such as marker 68, 70) within its FOV, it recovers location data with 3DOF (x, y and z). Due to the fixed geometrical relationship between two markers 68, 70 incorporated into the assembly of Controller 40 and holding fixture 60 (the "Assembly"), when the HMD detects both markers 68, 70 within its FOV, then two more degrees of freedom are recovered (namely, azimuth and elevation angles, also known as yaw and pitch). More specifically, this is possible because the optical system 16 is able to determine, with a high degree of precision, the exact location of each detected marker 68, 70. Further, because the geometrical relationship between the two detected markers 68, 70 (in the illustrated embodiment, the geometric relationship being a known distance separating the two markers along a straight line aligned with the longitudinal axis of Controller 40), it is possible for the optical system 16 to compute (again with a high degree of precision) the elevation/pitch angle and the azimuth/rotation angle of the Controller. The missing sixth degree of freedom is the roll angle along the axis connecting the two markers, which is not optically constrained, but which is easily recovered from the IMU 44 of the Controller 40.

As previously discussed, the gravity vector is known in both the Controller 40 and the optical sensor 16 frames of reference. Whenever the Controller 40 is not horizontal, it is possible to distinguish between the two markers 68, 70 by projecting their position onto the gravity vector and comparing the elevation and azimuth angles detected by the optical system 16 of the HMD 10 with the elevation and azimuth angles as measured by the IMU 44 of the Controller 40, respectively. For example, the elevation angle (vertical tilt) of the Controller IMU 44 should be expected to match (within some tolerance) the elevation angle derived by the optical system 16 of the HMD based on the optically detected relative locations of the two markers. If such angles match (within accepted tolerance), then it is possible to uniquely identify and label each marker 68, 70 (by which marker is positioned higher than the other and vice versa). Once the optical system 16 has been able to uniquely identify each marker to a predetermined level of confidence, then a unique marker ID is associated with each marker 68, 70. In addition, the assigned marker IDs are associated with the controller ID of Controller 40 (assigned to Controller 40 at the time Controller 40 initially paired with HMD 10) for future tracking purposes. On the other hand, mismatching values can be used to eliminate erroneous marker detections.

Similarly, the azimuth angle (horizontal heading) calculated by the optical system 16 of the HMD 10 is also expected to match (within a set tolerance) the azimuth angle of the two markers measured by IMU 44 (assuming IMU 44 incorporates a magnetometer). Alternatively, an azimuth offset between the Controller 40 and the optical sensor 16 frames of reference can be estimated by observation over several captured video frames where both markers 68, 70 are observed, and gradually updated over time to compute an appropriate azimuth offset angle and/or compensate for any IMU drift.

In subsequent frames, 6DOF tracking is still achieved even when one of the markers 68, 70 becomes blocked from view of the optical system 16 or moves outside the optical system's FOV. Since one marker is sufficient for the optical system 16 of the HMD 10 to recover position, and having previously uniquely identified each marker, the remaining orientation data can be derived from IMU 44 of Controller 40. The identity of the marker is persisted by proximity to previously estimated position of the markers.

If the Controller 40 moves completely outside the FOV of the optical sensor 16, Controller 40 can revert back to a 3DOF based on orientation data from IMU 44, and/or it can predict the position of Controller 40 based on a forward prediction algorithm, such as a Kalman filter using double integration operating on the accelerometer data from IMU 44.

The use of the reflective optical markers 68, 70 provide higher resolution and accuracy of detecting location and orientation than other methods. Even with good hand tracking and gesture recognition, it can still be difficult to distinguish between similar hand configuration and/or the how a controller is being held (e.g., the precise orientation of the controller in the hand). The use of two or more markers 68, 70, physically separated by a known distance, and coupled with the orientation data derived from the onboard IMU 44 of the Controller 40, provides increased accuracy and resolution while, at the same time, reducing the processing overhead required of other methods (such as hand tracking, pose recognition and/or skeletal segmentation/analysis). While hand tracking can be useful in identifying the region in the AR field where a hand is located, it can be difficult to detect precise location and/or fine rotational details based on hand tracking alone.

The physical separation between the two optical markers 68, 70 also allows for greater angular resolution with optical tracking than conventional approaches. Even greater resolution can be achieved by combining the location data derived from the optical system 16 of HMD 10 with the orientation data derived from the IMU 44 of Controller 40.

In addition, the combination of the markers and the IMU gives you greater accuracy and resolution without having to perform computationally intensive processing necessary for hand tracking and gesture recognition. And, because the processing is just dealing with two points in space that can be accurately identified by the optical sensor 16, it is also possible to detect small changes in orientation and/or rotation of the Controller.

Another aspect of the invention is to provide a system that includes an HMD device in combination with a wireless hand-held controller with passive optical and inertial tracking apparatus having a slim form-factor. In one embodiment, the system can include: a head mounted display device having a processor; a wireless hand-held inertial controller configured to communicate with the processor to selectively provide one or more user inputs, the hand-held inertial controller comprising a stylus having a first end, a second end and an elongate middle portion between the first end and the second end, the stylus also including a first optically reflective marker at or proximate the first end and a second optically reflective marker at or proximate the second end; and the elongate middle portion enclosing a microcontroller, an inertial measurement unit, a communications radio and one or more buttons configured and positioned for selective actuation with a finger or thumb of a user, the inertial measurement unit tracking orientation of the hand-held inertial controller in three dimensional space relative to a predetermined frame of reference and providing orientation and acceleration data to the microcontroller, and the communications radio providing wireless communications so as to provide orientation data and user inputs to the processor; and an optical sensor located on the display for determining the position of each of the first and second optically reflective markers relative to the display and for providing position data to the processor, wherein the processor uses the orientation data and the position data to track the hand-held inertial controller within three dimensional space with six degrees of freedom.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for holding a wireless hand-held input controller being used in a three dimensional (3D) environment for augmented reality or for virtual reality, the apparatus comprising:
    a housing comprising:
        a first end and a second end; and
        a central coupling portion located between said first and second ends, and wherein the wireless hand-held input controller and the central coupling portion are configured relative to one another so that the wireless hand-held input controller is able to be removably attached to the central coupling portion;
    a first optically reflective marker at or proximate the first end of the housing;
    a second optically reflective marker at or proximate the second end of the housing; and
    wherein the central coupling portion is positioned between the first and second optically reflective markers and wherein the position is defined by a fixed geometrical relationship between the central coupling portion and each of the first and second optically reflective markers, such that optical tracking of the wireless hand-held input controller when located in the 3D environment is enhanced when coupled to the central coupling portion, an enhancement occurring based on a determination of the position of the central coupling portion relative to the location of the first and second optically reflective markers as tracked in the 3D environment.

2. The apparatus of claim 1, wherein the first and second optically reflective markers are each spherical.

3. The apparatus of claim 2, wherein the first and second spherical optically reflective markers are each trackable in the 3D environment using an optical sensor system comprising an infrared depth camera mounted on a head-mounted display device (HMD).

4. The apparatus of claim 3 wherein, the first and second ends of the housing form an elongated stylus that establishes a sufficient baseline separating the first and second spherical optically reflective markers so that at least one of the first and second spherical optically reflective markers is visible by the infrared depth camera across a range of hand orientations used to hold the elongated stylus.

5. The apparatus of claim 4 wherein, the elongated stylus comprises a pistol grip attached to the elongated stylus adjacent the central coupling portion.

6. The apparatus of claim 3, wherein the HMD comprises a processor mounted to the HMD, and wherein the wireless hand-held input controller comprises an inertial measurement unit (IMU) comprising one or more sensors for determining orientation data of the wireless hand-held input controller, and a microprocessor that communicates to the processor of the HMD inputs derived from the IMU relative to the orientation data.

7. The apparatus of claim 6, wherein the processor of the HMD uses the orientation data as provided by the IMU of the wireless hand-held input controller and the location data of the wireless hand-held input controller as determined from the locations of the first and second optically reflective markers by the optical sensor system of the HMD to determine location and orientation of the wireless hand-held input controller in reference to the HMD with six degrees of freedom.

8. The apparatus of claim 7, wherein the HMD further comprises a position sensor system mounted to the HMD, the position sensor system comprising one or more sensors for determining orientation data of the HMD.

9. The apparatus of claim 8, wherein the processor of the HMD processes the orientation data as provided by the position sensor system of the HMD and the orientation data as provided by the IMU of the wireless hand-held input controller such that the HMD and wireless hand-held input controller are gravity aligned and north aligned.

10. The apparatus of claim 6, wherein the wireless hand-held input controller further comprises a wireless radio, one or more momentary switches and one or more status LED(s).

11. A system comprising:
a head-mounted display device (HMD) comprising:
  a processor;
  a wearable stereoscopic display adapted for displaying one of an augmented reality (AR) environment or a virtual reality (VR) environment; and
  an optical sensor system that produces location data at a particular instant of time for a wireless hand-held input controller, wherein the location data is defined by x, v and z coordinates;
the wireless hand-held input controller comprising:
  an inertial measurement unit (IMU) comprising one or more sensors for determining orientation data of the wireless hand-held input controller and wherein the orientation data is defined by pitch (elevation angle), yaw (azimuth angle) and roll (rotation) relative to a predetermined frame of reference; and
  a microcontroller that communicates to the processor of the HMD one or more user inputs relative to the orientation data; and
a holding fixture comprising:
  a housing comprising:
    a first end and a second end; and
    a central coupling portion located between said first and second ends, and wherein the wireless hand-held input controller and the central coupling portion are configured relative to one another so that the wireless hand-held input controller is able to be removably attached to the central coupling portion;
  a first optically reflective marker at or proximate the first end of the housing;
  a second optically reflective marker at or proximate the second end of the housing;
  wherein the location of the central coupling portion is between the first and second optically reflective markers and is defined by a fixed geometrical relationship between the central coupling portion and each of the optically reflective markers; and
  wherein the processor of the HMD uses the orientation data as provided by the IMU of the wireless hand-held input controller and the location data of the wireless hand-held input controller as determined by the processor of the HMD from the locations of the first and second optically reflective markers by the optical sensor system of the HMD to determine location and orientation of the wireless hand-held input controller in reference to the HMD with six degrees of freedom.

12. The system of claim 11, wherein the first and second optically reflective markers are each spherical and wherein the first and second spherical optically reflective markers are each trackable in the 3D environment using an infrared depth camera of the optical sensor system mounted on the head-mounted display device (HMD).

13. The system of claim 12, wherein the first and second ends of the housing form an elongated stylus that establishes a sufficient baseline separating the first and second spherical optically reflective markers so that at least one of the first and second spherical optically reflective markers is visible by the infrared depth camera across a range of hand orientations used to hold the elongated stylus.

14. The system of claim 13, wherein the elongated stylus comprises a pistol grip attached to the elongated stylus adjacent the central coupling portion.

15. The system of claim 12, wherein the HMD further comprises a position sensor system mounted to the HMD, the position sensor system comprising one or more sensors for determining orientation data of the HMD.

16. The system of claim 15 wherein the processor of the HMD processes the orientation data as provided by the position sensor system of the HMD and the orientation data as provided by the IMU of the wireless hand-held input controller such that the HMD and wireless hand-held input controller are gravity aligned and north aligned.

17. The system of claim 16 wherein the wireless hand-held input controller further comprises a wireless radio, one or more momentary switches and one or more status LED(s).

18. A holding fixture for use with a wireless hand-held controller that includes a microcontroller, an inertial measurement unit, a communications radio and one or more buttons configured and positioned for selective actuation with a finger or thumb of a user, the holding fixture comprising:
a housing having a first end and a second end;
a first optically reflective marker at or proximate the first end of the housing;
a second optically reflective marker at or proximate the second end of the housing; and
a docking portion located on the housing between the first optically reflective marker and the second optically reflective marker, the docking portion having a size and shape that is complementary of the size and shape of the wireless hand-held controller and is configured to selectively couple the wireless hand-held controller to the holding fixture in a fixed spatial relationship relative to the first optically reflective marker and the second optically reflective marker.

19. The holding fixture of claim 18, wherein the first and second optically reflective markers are each spherical and comprise an IR transmissive material that blocks light in the visible spectrum but allows light in the IR range to pass through the material in order to allow the first and second spherical optically reflective markers to be hidden from view without limiting IR detection of the first and second spherical optically reflective markers, and wherein the first and second spherical optically reflective markers are each trackable in the 3D environment using an infrared depth camera mounted on a head-mounted display device (HMD).

20. The holding fixture of claim 19, wherein the first and second ends of the housing form an elongated stylus that establishes a sufficient baseline separating the first and second spherical optically reflective markers so that at least one of the first and second spherical optically reflective markers is visible by the infrared depth camera across a range of hand orientations used to hold the elongated stylus.

* * * * *